P. MUELLER.
TOOL FOR INSERTING CORPORATION COCKS.
APPLICATION FILED JAN. 24, 1912.
1,024,096.
Patented Apr. 23, 1912.
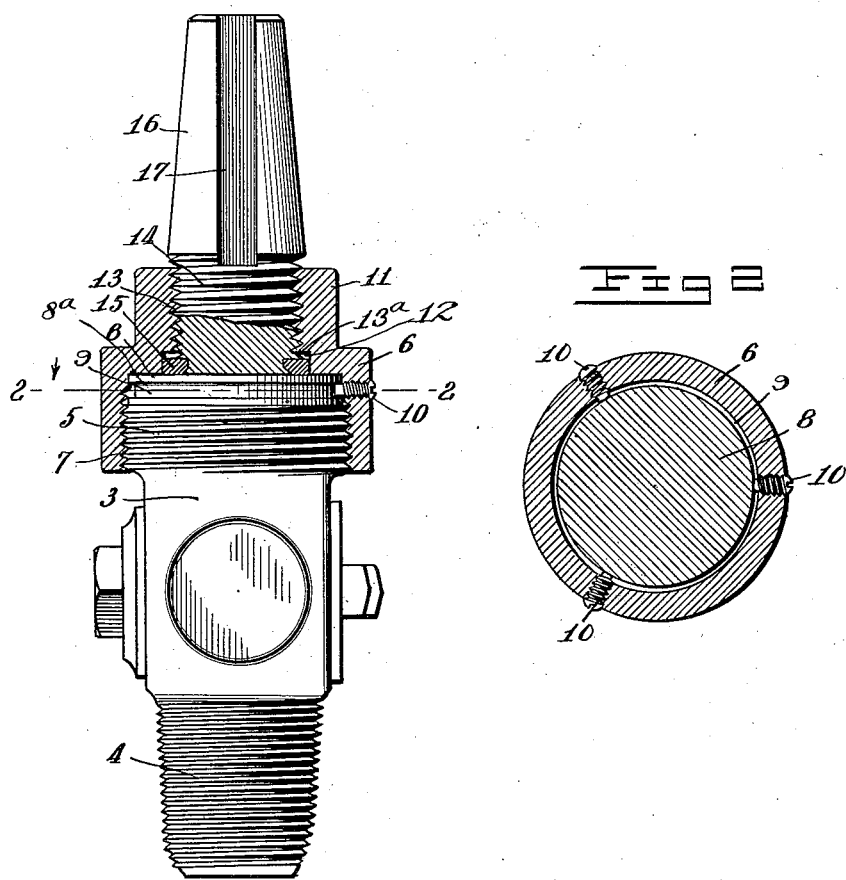
Inventor
Philip Mueller

UNITED STATES PATENT OFFICE.

PHILIP MUELLER, OF DECATUR, ILLINOIS, ASSIGNOR TO THE H. MUELLER MANUFACTURING COMPANY, OF DECATUR, ILLINOIS, A CORPORATION OF ILLINOIS.

TOOL FOR INSERTING CORPORATION-COCKS.

1,024,096. Specification of Letters Patent. Patented Apr. 23, 1912.

Application filed January 24, 1912. Serial No. 673,249.

*To all whom it may concern:*

Be it known that I, PHILIP MUELLER, a citizen of the United States, residing at Decatur, in the county of Macon and State of Illinois, have invented new and useful Improvements in Tools for Inserting Corporation-Cocks, of which the following is a specification.

My invention relates to tools for inserting corporation cocks in mains, my more particular purpose being to produce such a tool having special provision for avoiding injury to the coupling threads of the member to be inserted.

My invention may be made in different forms, and used in connection with corporation cocks of different types, but for the sake of simplicity and conciseness I show the device as employed with a lead flange cock of ordinary construction and having an external thread, or coupling thread, used for the purpose of inserting the corporate cock in the main.

It has heretofore been the practice in some instances to provide the upper portion of the corporation cock with an internal thread to engage the tool or other member used for inserting the cock in the main. This practice, however, has not only necessitated extra work in drilling and tapping in order to obtain the internal thread necessary for the purpose just stated, but has been the cause of various other troubles. For instance it has often happened, that in inserting a cock provided with internal threads by means of a boring bar too much power or leverage is applied to the handle of the boring bar, thereby distorting the portion of the cock carrying the male coupling threads on the outlet end of the cock, so that after the plug on the boring bar has been removed from the cock, a water-tight connection cannot be made with the male coupling threads. Where a coupling or union is used the male thread is oftentimes so spread, that the coupling cannot be screwed onto the corporation cock and necessitates the shutting off of the mains for the inserting of a new cock, which would cause much trouble in case of a fire.

In my present invention I seek to avoid all necessity for boring and tapping in order to provide the internal thread, and I further seek to use the external or service thread for the purpose of turning the cock relatively to the main. In doing this I also seek to avoid injury to the external thread.

In carrying out the purposes just mentioned I provide a tool having in this instance an internal thread for fitting the service thread of the corporation cock, the tool being further provided with a revoluble shank which is not detachable from it, and loosely mounted within the tool is a locking disk having a smooth face against which the adjacent end of the revoluble shank squarely abuts, and having also another smooth face opposite the revoluble shank and used for abutting directly against the adjacent end of the corporation cock so that the locking disk, being thus squeezed tightly between two abutting faces and being unable to yield to the pressure, causes the tool and the corporation cock to turn as a unit. When, however the shank is rotated in the opposite direction, it is readily disengaged from the locking disk, whereupon the latter becomes loose and a tool is in turn rendered loose relatively to the corporation cock, and by further rotation of the shank is readily removed.

Reference is made to the accompanying drawing forming a part of this specification, and in which like letters indicate like parts.

Figure 1 is a view partly in elevation and partly in section, showing my device complete and fitted upon a corporation cock provided with an external service thread. Fig. 2 is a section on the line 2—2 of Fig. 1, looking in the direction of the arrow.

The corporation cock is shown at 3 and is provided with a frusto-conical portion 4 having a thread as shown, and is also provided with a portion 5 of increased diameter and carrying a thread the general diameter of which is uniform—that is the thread is of a type commonly designated as a "parallel" thread. A sleeve 6 is provided internally with a threaded portion 7 for fitting upon the threaded portion 5, and is also provided with an annular shoulder 8ª. A locking disk 8 is provided with a peripherally disposed groove 9 and a number of screws 10 extend through the wall of the sleeve 6 and are provided with smooth ends projecting into this groove. The screws 10 are adjustable though as a rule when once adjusted they need but little attention. The disk 8 is by aid of these screws retained within the sleeve 6, but is loose relatively to the latter, or, in other words, has a slight amount of play. The sleeve 6 is provided also with a reduced portion 11 suitable for engagement by a wrench, and which may be made angular for this purpose if desired. The sleeve 6 is further provided with an annular groove 12 and with an internal thread 13 extending from the top of the sleeve down to the groove, the diameter of the groove 12 being slightly greater than that of the thread 13. Partially bounding the groove 12 is an annular shoulder 13a with which the sleeve 6 is provided. A threaded shank 14 extends into the sleeve and engages the thread 13. Swaged upon the lower or inner end of the threaded shank is a collar 15 which is to all intents and purposes practically a portion of the said shank 14, but having a greater diameter than the latter. When the shank is turned the collar 15 turns with it and has a little play within the groove 12. The threaded shank 14 is provided with a suitable surface 16 to facilitate its connection with the boring bar of a tapping machine, and is further provided with a key-way 17 used also for facilitating this purpose.

In the absence of any locking action between the shank 14, the locking disk 8 and the upper face of the corporation cock, the sleeve 6 may readily be unscrewed from the cock after the insertion of the latter in a main. This is because the threaded conical portion 4, in consequence of its tapering form and of the considerable contacting area between it and the main, is rather difficult to disengage, whereas the lower internal threaded portion of the sleeve 6 is easily disengaged from the service threads of the corporation cock in consequence of the fact that the threads upon these two parts are so-called " parallel " threads, and further because the contacting area of the surfaces is relatively small. When, however, the various parts are fitted together as indicated in Fig. 1 and the threaded shank is turned so as to force its lower end against the locking disk 8, and this locking disk is in turn forced against the adjacent abutting face of the corporation cock, the sleeve 6 cannot turn relatively to the cock, and as a consequence the frusto-conical portion 4 is driven with any desired degree of force into the main.

As may readily be seen, the thread carried by the tapering portion 4 of the corporation cock 3 has a diameter greater than that of the parallel threads 13. Aside from this difference in diameters it is evident from the fact that the thread 4 is a tapering thread and the threads 13 are parallel threads, that the thread 4 has a larger frictional contact surface and is adapted for a more pronounced wedging action, than the loosely fitting parallel threads 13. From these facts it will be noted, as has been demonstrated in actual use, that when the rotation of the boring bar is reversed the threads 13 of the inserting plug easily become disengaged, thereby loosening the frictional contact on both sides of the disk, so that the threads 4 cannot lose any part of their grip on the main.

It will be seen that when the sleeve 6 of my improved tool is screwed upon the threaded portion 5 of the corporation cock, the upper surface of the disk 8 is clamped tightly against the shoulder 8a of the sleeve 6, bringing the lower edge of the groove 9 almost against the bottom of the set screws 10. When, however, the screw plug 16 is turned by the boring bar incidental to the operation of inserting the corporation cock in the main, the lower part of the screw plug 16 breaks the frictional engagement between the upper surface of the disk 8 and the mating shoulder 8a, and thus clamps the disk tightly against the top of the corporation cock. This avoids all strain which might otherwise have been exerted against the set screw 10 by the adjacent boundary of the groove 9. Thus at all times while the tool is in use, no strain whatever is exerted upon the set screws 10.

When the screw plug 16 is turned backwardly or reversed, it is prevented from withdrawing from the sleeve 6. This is due to the fact that it has been swaged at its lower extremity into the collar 15. This collar therefore abuts against the shoulder 13a, rendering it impossible for the screw plug 16 to be extracted from the sleeve 6. Therefore when the frictional contact on both sides of the disk 8 has been eliminated, the threaded portion 7 of the sleeve 6 is forced to disengage from the threaded portion 5 of the corporation cock, leaving the corporation cock screwed tightly into the main.

It will be noted that the revoluble threaded shank 14 cannot be detachable from the sleeve 6, owing to the fact that the collar 15 always holds these two parts together. This is a very important feature as it prevents the threaded shank from dropping out of the sleeve, and also prevents both sleeve and shank from becoming separated accidentally or otherwise. I preferably make the shank thread 14 of coarser pitch than the sleeve thread 7 so that when the boring bar is reversed the thread 13 will be released more easily than the thread 7.

The operation of my device is as follows: In order to apply the tool the operator turns the threaded shank 14 by hand relatively to the sleeve 6 until the collar 15 is moved so far as it will travel upward according to Fig. 1—that is, away from the locking disk 8. The sleeve 6 is next screwed upon the upper or larger end of the corporation cock until the locking disk 8 is brought into such position that its lower face abuts squarely against the upper face of the cock, and its upper face abuts against the shoulder 8ª of the sleeve 6. Then the threaded shank 14 is next turned tightly against the top of the disk, and the frusto-conical portion 16 of the threaded shank is next secured to the boring bar of a tapping machine and the entire group of parts shown in Fig. 1 is lowered through the tapping machine so that the frusto-conical threaded portion 4 is inserted into a hole previously tapped into the main. The boring bar being now rotated, the threaded shank is turned. As the lower face of the locking disk is already resting squarely upon the upper face of the cock the continued rotation of the boring bar causes the shank to press with great force upon the locking disk and causes this disk to press also with great force upon the adjacent surface of the cock; and as none of these parts can yield, the cock is turned with the rotation of the shank and boring bar until completely inserted within the main.

In order to detach the tool, the direction of rotation of the boring bar is simply reversed. This causes the shank 14 to turn backwardly and in so doing to raise the collar 15 out of engagement with the locking disk 8, thus relaxing the pressure of this locking disk upon the upper abutting surface of the cock. This being done the sleeve has nothing to hold it except the mere friction of its lower internal parallel thread contacting with the mating thread carried by the cock. As soon, therefore, as the collar 15 reaches the upper limit of its travel the sleeve 6 begins to rotate and in a few turns is completely disconnected from the cock.

While I show my device as used in connection with a corporation cock, the service thread of which is located externally, it is obvious that by placing the lower thread of the sleeve 6 upon the outside of said sleeve the device could be used in connection with a cock the service thread of which is located internally.

I do not limit myself to the particular form shown, as this is merely typical, and the means for practicing my invention may be varied within limits commensurate with my claims.

I claim:

1. A tool of the character described comprising a sleeve provided with a surface for engaging a mating surface of a corporation cock, a locking member located within said sleeve and adapted to be pressed directly against an adjacent abutting portion of said cock in order to lock the same relatively to said sleeve, a shank carried by said sleeve and movable relatively to the latter for actuating said locking member, and means for preventing the removal of said shank from said sleeve.

2. A tool of the character described comprising a sleeve provided with a surface for engaging a mating surface of a corporation cock, a locking member connected with said sleeve and adapted to be pressed into abutting engagement with said corporation cock, and a screw threaded shank within said sleeve and non-detachable relatively thereto.

3. A tool of the character described comprising a sleeve provided with a surface for engaging a mating surface of a corporation cock, a locking member mounted loosely within said sleeve and provided with a face for abutting directly against an adjacent face of the corporation cock, said locking member being further provided with a face disposed upon the opposite side thereof from said first-mentioned face, a shank extending into said sleeve and provided with means controllable by rotation of said shank relatively to said sleeve for forcing said shank directly against said locking member, and means for preventing the removal of said shank from said sleeve.

4. A tool of the character described comprising a sleeve provided with a thread of fine pitch for engaging a mating thread of a corporation cock, said sleeve being further provided internally with a thread of coarser pitch, a revoluble shank engaging said sleeve and provided with a thread having a pitch mating said coarser pitch, a locking member located within said sleeve and provided with a face for abutting directly against a face of the corporation cock, and means for preventing the removal of said revoluble shank from said sleeve.

5. A tool of the character described, comprising a sleeve provided with a surface for engaging a mating surface of a corporation cock, a locking member mounted within said sleeve and provided with a face for abutting directly against an adjacent face of the corporation cock, said locking member being further provided with a face disposed upon the opposite side thereof from said first mentioned face, the locking member being also provided with a peripheral groove whereby it is held in said sleeve by suitable retaining means, said retaining means being so positioned with reference to the peripheral groove and abutting surface of the locking member and sleeve carrying it, so as to be free from strain during the manipulation, and a shank extending into said sleeve, and provided with means for rotating said shank relatively to said sleeve in order to force said shank directly against the locking member, and means for preventing the removal of said shank from said sleeve.

In testimony whereof I have hereunto set my hand in presence of two subscribing witnesses.

PHILIP MUELLER.

Witnesses:
 WILLIAM R. BIDDLE,
 CATHERINE E. McKEOWN.

Copies of this patent may be obtained for five cents each, by addressing the "Commissioner of Patents, Washington, D. C."